(12) United States Patent
Larsen et al.

(10) Patent No.: US 7,424,996 B2
(45) Date of Patent: Sep. 16, 2008

(54) WIRE ROPE PRE-FAILURE INDICATOR AND METHOD OF USING SAME

(76) Inventors: Stuart Larsen, 1198 Navigator Dr., #78, Ventura, CA (US) 93001-4300; William Turnbull, 648 Good Hope St., Oak View, CA (US) 93022-9712

( * ) Notice: Subject to any disclaimer, the term of this patent is extended or adjusted under 35 U.S.C. 154(b) by 94 days.

(21) Appl. No.: 11/606,824

(22) Filed: Nov. 29, 2006

(65) Prior Publication Data

US 2008/0121170 A1 May 29, 2008

(51) Int. Cl.
*B21F 9/00* (2006.01)
(52) U.S. Cl. ............... 254/243; 73/862.53; 73/862.451; 403/2; 200/61.13; 116/212
(58) Field of Classification Search ............... 254/243; 73/862.53, 862.451, 862.42; 403/2; 116/212; 200/61.13
See application file for complete search history.

(56) References Cited

U.S. PATENT DOCUMENTS

| | | | |
|---|---|---|---|
| 2,382,351 A | 8/1945 | Thorpe | |
| 2,679,228 A | 5/1954 | Gryce | |
| 3,024,647 A | 3/1962 | Merriman | |
| 3,077,178 A | 2/1963 | Gordon | |
| 3,410,246 A | 11/1968 | Lowe | |
| 3,436,962 A | 4/1969 | Laws | |
| 3,885,428 A | 5/1975 | Dalferth | |
| 3,908,452 A | 9/1975 | Rieger | |
| 3,910,224 A | 10/1975 | Thompson et al. | |
| 3,922,104 A * | 11/1975 | McCullough | ............... 403/2 |
| 4,163,126 A | 7/1979 | Van Mastrigt | |
| 4,245,139 A | 1/1981 | Orscheln et al. | |
| 4,402,229 A | 9/1983 | Byrne | |
| 4,509,376 A | 4/1985 | Thomasson | |
| 4,571,582 A | 2/1986 | Walter | |
| 4,720,204 A * | 1/1988 | Johnson | ............... 403/24 |
| 4,992,778 A | 2/1991 | McKeen et al. | |
| 5,365,797 A | 11/1994 | McCrory, III | |
| 5,390,606 A * | 2/1995 | Harris | ............... 102/378 |
| 5,400,868 A | 3/1995 | Ellis et al. | |
| 5,466,082 A | 11/1995 | Sherar | |
| 5,474,408 A * | 12/1995 | Dinitz et al. | ............... 411/5 |
| 5,655,476 A | 8/1997 | Wolter | |
| 7,032,466 B2 | 4/2006 | McCauley | |

* cited by examiner

Primary Examiner—Emmanuel M Marcelo (57) ABSTRACT

A wire rope pre-failure indicating device that can be installed at any location along a length of conventional wire rope of the character used in many industrial applications. The indicating device reliably functions to provide a pre-failure warning that the wire rope has been loaded beyond a specified magnitude. The indicating device also provides a pre-failure warning that the swaged fittings, which interconnect the indicator to the wire rope, have undesirably slipped.

20 Claims, 6 Drawing Sheets

WIRE ROPE PRE-FAILURE INDICATOR AND METHOD OF USING SAME

BACKGROUND OF THE INVENTION

1. Field of the Invention

The present invention relates generally to safety devices. More particularly, the invention concerns a wire rope pre-failure indicating device and method of using the same that can be installed at any location along a length of conventional wire rope that provides a pre-failure warning that the wire rope has been loaded beyond a specified magnitude.

2. Discussion of the Prior Art

Flexible wire rope of various sizes is commonly used in various types of industrial applications, including cranes and similar lifting equipment. Wire rope is also extensively used in automotive and aircraft running gear, in marine halyards and in various other types of mechanical control systems.

In many prior art applications, the flexible wire rope is exposed to wear and potential damage as a result of being threaded through various pulleys and sheave configurations and of being wrapped upon and unwrapped from storage drums.

Less flexible wire rope of various sizes is more often used in more static applications such as stays to support construction elements, crane booms, towers, telephone poles, construction masts, and marine rigging.

In virtually all of the prior art applications the wire rope is installed into the load path by one of two techniques. In one technique the wire rope is wrapped around a thimble with the free end of the wire rope clamped to itself using either a mechanical clamp or a lead lug that is crimped onto the wire rope with a crimping tool. The second technique typically involves the step of swaging a designed eye or clevis end fitting onto the wire rope by extruding a section of the fitting into the twisted strands of the wire rope using a hydraulic die.

When dynamic tension is applied to the wire rope during any of the aforementioned applications, the wire rope can become overstressed. If the overstressed condition of the wire rope is not promptly discovered and the situation promptly corrected, the overstressed wire rope will fail resulting in serious and, on occasion, catastrophic damage or injury. The thrust of the present invention is to solve this serious prior art problem by providing an easy-to-use, highly reliable wire rope pre-failure indicating device that can be installed at any location along a length of conventional wire rope of the type used in a common industrial application and will function to provide a pre-failure warning that the wire rope has been overstressed and that corrective action must be taken.

U.S. Pat. No. 5,466,082 issued to Sherar, which is directed to an in-line safety shackle for a cable system, is primarily directed to a safety device for use in the logging industry. The Sherar device comprises a first member adapted to engage a first cable, and a second member adapted to engage a second cable, wherein the second member releasably inter-fits with the first member. At least one safety cable is provided for substantially permanently securing the first member to the second member. The device also comprises means releasably connecting the first member to the second member, the means being provided with a pre-determined shear force sufficient to release the first member from the second member before the first or second cable breaks due to the dynamic tension placed on the cables. The Sherar patent also describes an in-line safety shackle device for a cable system that includes a first cable and a second cable comprising a first member adapted to releasably engage the first cable. The first member includes a first cable shaft and a first shear pin shaft. The first member further includes at least one safety cable shaft for receiving a first end of a safety cable. The device further comprises a second member adapted to releasibly engage the second cable. The second member includes a second cable shaft and a second shear pin shaft, wherein the second member is adapted to releasibly inter-fit with the first member. The shear pin is provided with a designed shear strength which is less than the tensile force of the safety cable.

The prior art patent to Ellis, et al., U.S. Pat. No. 5,400,868, concerns a shock-load indicator for use with a safety cable, and more particularly to a shock-load indicator for use with retracting life line devices. The Ellis, et al., shock-load indicator comprises a casing surrounding a section of the cable, having severable top and bottom sections connected through a shearing means. The casing normally supports the weight of the user of the cable, and encloses a length of the cable such that, when the cable is extended as a result of the severance of the casing due to a fall induced shock-load, the top and bottom sections separate by a pre-determined distance indicating that the cable has been subjected to a shock-load.

SUMMARY OF THE INVENTION

By way of brief summary, the wire rope pre-failure indicating device of the invention, which is of a simple, easy-to-use construction, can be installed at any location along a length of conventional wire rope of the character used in many industrial applications and reliably functions to provide a pre-failure warning that the wire rope has been loaded beyond a specified magnitude. The device also provides a pre-failure warning that the swaged fittings, which interconnect the indicator to the wire rope, are in jeopardy of slipping. In use, the device is typically swaged onto the wire rope in the same manner as eye-and-clevis end fittings are swaged onto the wire rope. When a specified tensile load in the wire rope is exceeded, the indicator uniquely provides a visible indicator that an overload condition has occurred. When the overload condition occurs, the indicator automatically transfers the load from the indicator body to the wire rope so as to maintain the integrity of the load path. In one form of the invention the body is locally work-hardened to provide specific material failure characteristics. In another form of the invention the body is provided with strategically spaced-apart gauge marks that can be used to determine that an overload condition has occurred.

In the preferred form of the invention, the wire rope pre-failure indicator device comprises a generally cylindrically shaped, machined body having a central section and tapered end portions. A concentric, longitudinal bore of a diameter to fit a specific wire rope size is machined through the entire length of the device. A lateral slot slightly wider than the diameter of the longitudinal bore is machined proximate the central one third of the device and may be locally work-hardened to remove the ductility or otherwise adjust the material properties of that material in the failure section. A circumferentially extending, circular groove is then machined proximate the mid-point of the slot.

In using the device of the invention, the wire rope is first threaded through the entire length of the device and the device is strategically positioned along the length of wire rope at the desired location. With the device located in the desired position, the wire rope is pushed towards the center of the device in a manner to form a small arc, or slack in the rope. This done, the end portions of the device are swaged onto the wire rope in a conventional manner well known in the art. The swaged length at each end section of the device is of less length than the swaged length of typical eye-clevis end fittings. It is to be appreciated that with the construction thus described, the section of the wire rope that is disposed within the slotted center portion of the device (the tension-free section) will support no tensile load.

As a tensile force is applied to the wire rope, the force will be transferred from the leading swaged section of the device to the outer center section or outer body of the device. The tensile force in the outer body of the device will then be transferred back into the wire rope as it continues through the swaged section at the opposite end of the device. As previously mentioned, that portion of the wire rope with the slight circular arc or slack in the center of the lateral slot supports no load.

It is to be observed that the section perpendicular to the longitudinal axis of the device at the groove location is the critical cross section of the device due to the stress concentration created by the reduced cross-sectional area at the groove location. It is apparent that if the axial load placed on the device becomes excessive, the device will fail at this groove cross section.

With the forgoing in mind, the primary function of the device of the invention is to fail at a specified tensile load magnitude for the size of the particular wire rope to which the device is interconnected. For example the device may be designed to fail at a designated percent, for example 60%, of the breaking load of the particular wire rope. When this load is exceeded, the outer body of the device will fail and the load will be transferred back into the tension-free, or arcuate section of the wire rope causing it to visibly straighten.

In the design of the device, the elastic properties of both the device and the wire rope are considered so that shock-loading of the wire rope is minimized during device failure. In this regard, the failure characteristics of the material within the tension-free-slot may be adjusted by local work hardening before the reduced area is machined. If the device has failed in the reduced area section as indicated by the visible straightening of the arcuate section of the rope, then the wire rope system has been overloaded and should be replaced.

For a wire rope system that is repeatedly loaded and unloaded longitudinally spaced gauge marks may be added to the body portion of the device on either side of the reduced area section. These important gauge marks can be used to track the load history of the wire rope by measuring the distance between the gauge marks each time the wire rope is unloaded and recording any increase in the distance between the gauge marks caused by excessive loading of the system.

With the foregoing in mind it is an object of the present invention to provide a wire rope pre-failure indicating device, which is of a simple, easy-to-use construction, can be installed at any location along a length of conventional wire rope and functions to provide a readily visible pre-failure warning that the wire rope has been loaded beyond a specified magnitude.

Another object of the invention is to provide a device of the aforementioned character that also provides a readily visible pre-failure indicator that the swaged sections, which interconnect the fuse to the wire rope, have slipped and thus suggesting that other swaged sections of greater length within the system may also be in jeopardy of slipping.

Another object of the invention is to provide a device as described in the preceding paragraphs that includes a viewing portal that enables the status of the device to be conveniently and frequently checked by relatively unskilled observers. More particularly, the viewing portal enables observers to easily see on a real time basis the pre-failure warnings that occur when the wire rope has been loaded beyond a specified magnitude.

Another object of the invention is to provide a wire rope pre-failure indicating device that includes a central body portion upon which longitudinally spaced-apart gauge marks are provided that can be conveniently used to track the load history of the wire rope by measuring the distance between the gauge marks each time the wire rope is unloaded and recording any increase in the distance between the gauge marks caused by excessive loading of the system.

Another object of the invention is to provide a device of the character described in the preceding paragraph in which the body portion of the device is locally work-hardened in order to more accurately control the failure load and to minimize shock-loading of the wire rope during system failure.

Another object of the invention is to provide a wire rope pre-failure indicating device of the character described that is approximately the same size and appearance as that of conventional prior art eye-or-clevis end fittings.

Another object of the invention is to provide a wire rope pre-failure indicating device that can be interconnected with the wire rope by relatively unskilled workers using a skill level and type and quality of equipment that is comparable to that used to interconnect standard prior art end fittings with wire cables.

Another object of the invention is to provide a wire rope pre-failure indicating device that is designed to fail at a pre-selected percent of the breaking strength of the wire rope with which it is being used. More particularly, for a selected wire rope size, the indicating device can, by way of example, be designed to fail at 50%, 60%, 70%, or even 80% of the breaking load of the wire rope with which it is being used.

Another object of the invention is to provide a wire rope pre-failure indicating device that includes a conventional eye fitting that can be conveniently swaged on the end of a wire rope.

Another object of the invention is to provide a wire rope pre-failure indicating device that includes a conventional clevis fitting that can be conveniently swaged on the end of a wire rope.

The foregoing as well as other objects of the invention can be achieved by the indicating device described in greater detail in the paragraphs which follow.

DESCRIPTION OF THE INVENTION

Figure 1:
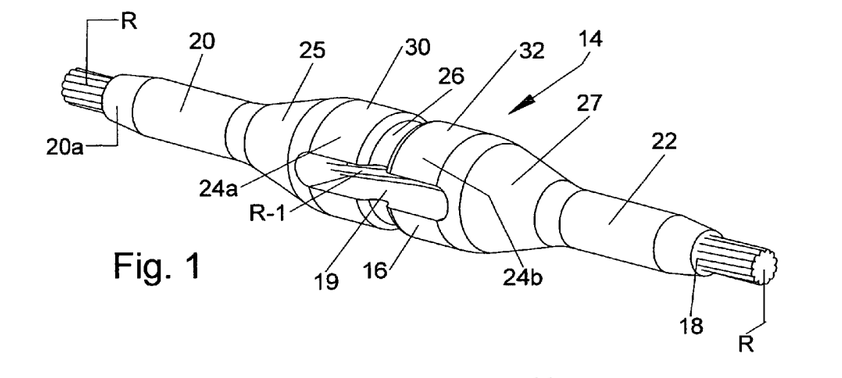
FIG. 1 is a generally isometric view of one form of the wire rope pre-failure indicating device of the invention.
Figure 1A:
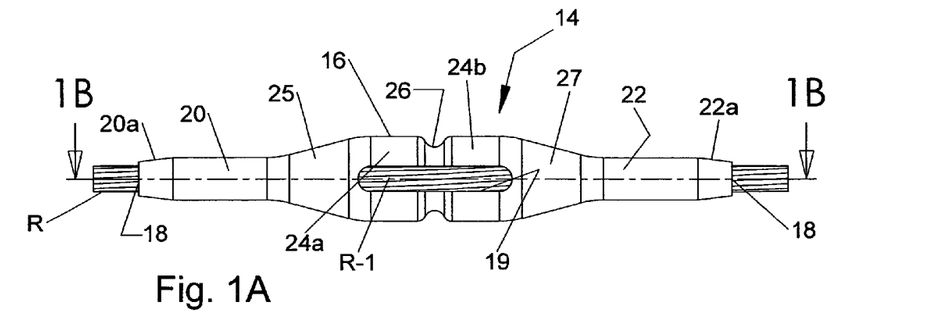
FIG. 1A is a side-elevational view of the wire rope pre-failure indicating device shown in FIG. 1.
Figure 1B:
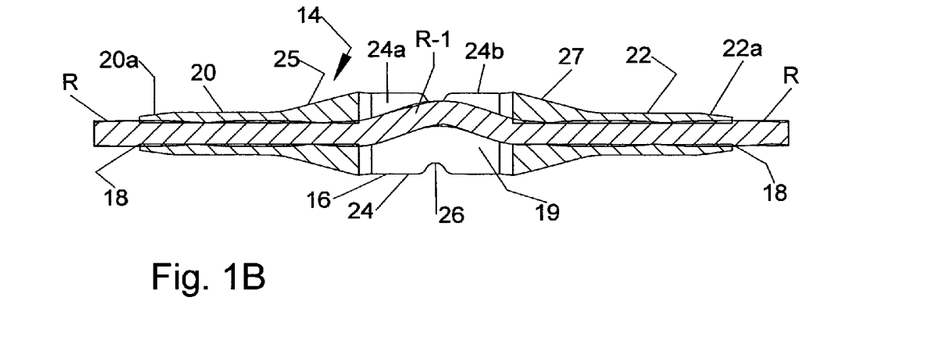
FIG. 1B is a cross-sectional view taken along lines 1B-1B of FIG. 1A.

Referring to the drawings and particularly to FIGS. 1, 1A, 2 and 2A, one form of the pre-failure indicating device of the invention is there shown and generally designated by the 14. The indicating device 14 is specifically designed for use with a length of wire rope "R" that will fail in tension upon applying a load of a first magnitude to the wire rope. In the present form of the invention the indicating device 14 comprises a generally cylindrical casing 16 that surrounds a portion of the wire rope in the manner illustrated in FIGS. 1 and 1B. As shown in FIGS. 1, 1A and 1B, casing 16 is provided with a longitudinal wire rope receiving bore 18 therethrough for receiving the uninterrupted length of wire rope "R". Additionally, casing 16 is provided with a viewing portal, here shown as a longitudinally extending slot 19, for viewing the length of wire rope. Casing 16 here includes first and second spaced-apart end portions 20 and 22 that are swaged sections connected to the wire rope and a central body portion 24 that is disposed between the first and second end portions. Disposed between central body portion 24 and first end portion 20 is a tapered portion 25. Similarly, disposed between central body portion 24 and second end portion 22 is a tapered portion 27. Preferably, end portions 20 and 22 are interconnected with the wire rope by swaging these sections as well as the terminal portions 20a and 22a to the wire rope in a conventional manner. However, as illustrated in FIGS. 1 and 1B, after the sections 20 and 20a have been swaged to the wire rope, and prior to the portions 22 and 22a being swaged to the wire rope, the wire rope is urged inwardly in a manner to form within the central portion 24a (FIG. 1B) of body 24 an arc, or slack portion designated in the drawings as "R-1". After the swaging operation is complete, this important slack portion "R-1" is readily visible through the viewing portal, or longitudinally extending slot 19 formed in the central portion of the casing.

Figure 2:
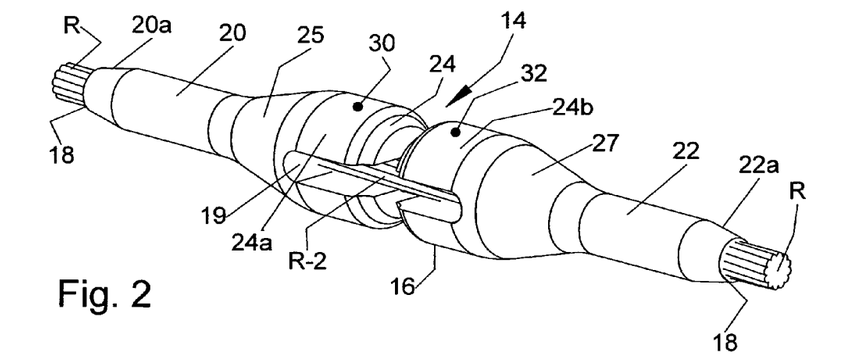
FIG. 2 is a generally isometric view similar to FIG. 1, but showing the device as it appears after the loading of the wire rope has exceeded a specified magnitude and the frangible central portion of the device has been broken.
Figure 2A:
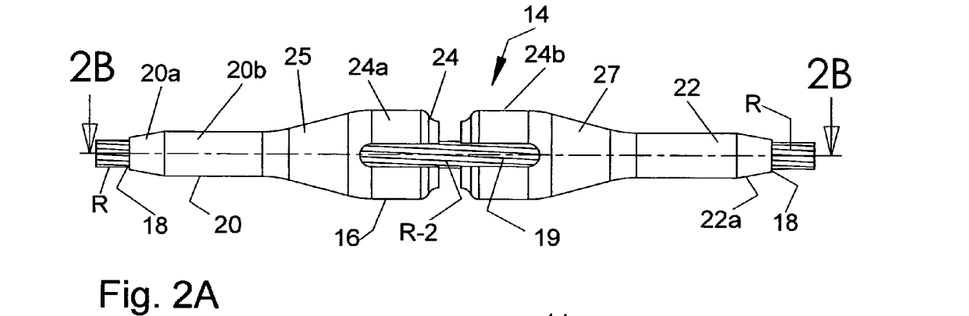
FIG. 2A is a side-elevational view of the wire rope pre-failure indicating device shown in FIG. 2.
Figure 2B:
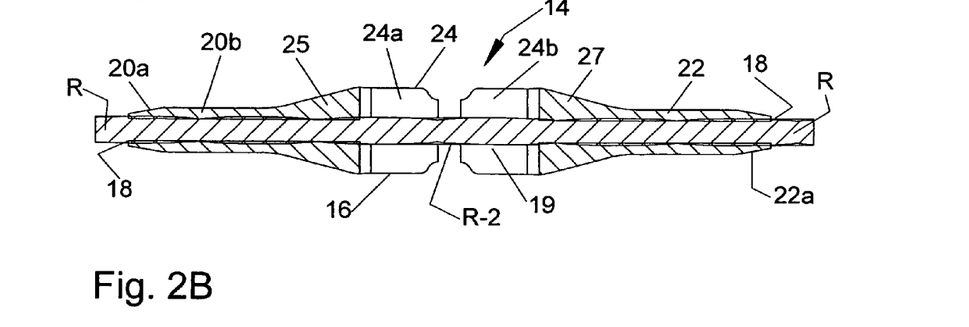
FIG. 2B is a cross-sectional view taken along lines 2B-2B of FIG. 2A.

As previously mentioned, a primary function of the indicator device of the invention is to fail at a specified second tensile load magnitude for the size of the particular wire rope to which the device is interconnected. Accordingly, an important feature of the device of the present invention resides in the provision of a central body frangible portion that will fail in tension upon applying a load of a second magnitude to the wire rope. This central body frangible portion can take various forms, but in the form of the invention shown in FIGS. 1 and 2 is uniquely provided in the form of a circumferentially extending, reduced diameter portion, or groove 26. As indicated in FIGS. 2, 2A and 2B of the drawings, when a load of a second pre-determined magnitude, which is less than the load of a first magnitude, is placed on the wire rope the central body frangible portion will fail resulting in a separation of portions 24a and 24b of central body 24.

As the central body frangible portion 26 fails, the tensile force being applied to the wire rope will be transferred from the leading swaged sections 22 and 22a of the device to the outer body section 24b. The tensile force will then be transferred back into the wire rope as it continues through the swaged sections 20 and 20a located at the opposite end of the device. As the tensile force is transferred back into the wire rope, the arcuate portion "R-1" of the wire rope will automatically visibly straighten (indicated as R-2) thereby providing a readily observable warning that the load on the wire rope has exceeded an acceptable magnitude (see FIGS. 2A and 2B). If the device has failed in the reduced diameter portion 26, as indicated by the visible straightening of the arcuate section of the rope, then the wire rope system has been overloaded and should be replaced.

Another important feature of the invention is to provide a wire rope pre-failure indicating device that is designed to fail at a pre-selected percent of the breaking strength of the wire rope with which it is being used. By way of example of, the indicating device can be designed to fail at 40%, 50%, 60%, or even 70% of the breaking load of the wire rope with which it is being used.

The device illustrated in FIGS. 1, 1A, 1B, 2, 2A and 2B of the drawings is specifically designed to fail at 60% of the breaking load of the wire rope "R". Accordingly, when this load is exceeded, the outer body of the device will fail in the manner described in the preceding paragraph and the load will be transferred back into the tension-free, or arcuate section of the wire rope causing it to visibly straighten.

In the design of the device, the elastic properties of both the device and the wire rope are considered so that shock-loading of the wire rope is minimized during device failure. In this regard, the failure characteristics of the material within the tension-free-slot may be adjusted by local work hardening before the reduced area is machined.

For a wire rope system that is repeatedly loaded and unloaded another novel means for determining overstressing of the wire rope is provided. In this regard, after the reduced area 26 has been machined into the body of the device, two small indentations 30 and 32 (see FIG. 1) are symmetrically machined into the top surface of the body 16. These small indentations, which comprise gauge marks, are preferably located precisely 0.750 inches on either side of the center of the reduced area 26 to provide a gauge mark having a length of 1.500 inches. When the indicator device is in the unloaded state, the gauge mark length can be accurately measured with a linear caliper to be 1.500 inches. In the situation where the frangible portion of the device has not failed and the gauge mark length measures greater than 1.500, then the wire rope has been overstressed to some degree. By making frequent measurements of the spacing between the gauge marks, the load history of the wire rope can be definitively recorded and maintained.

Therefore, in accordance with one form of the method of the invention, these important gauge marks are used to track the load history of the wire rope by measuring the distance between the gauge marks each time the wire rope is unloaded and recording any increase in the distance between the gauge marks caused by excessive loading of the system.

Figure 3:
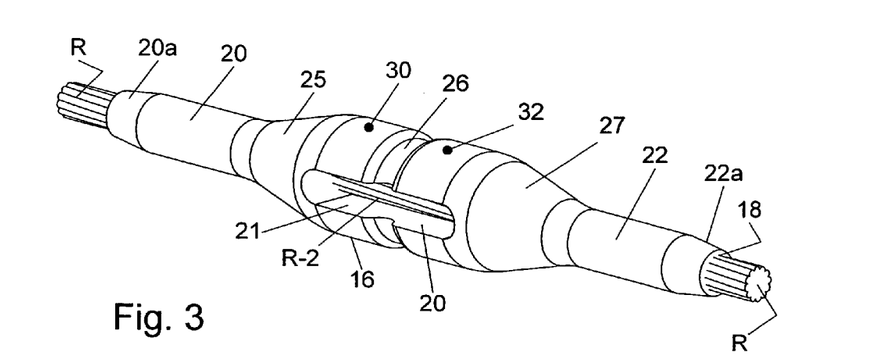
FIG. 3 is a generally isometric view similar to FIG. 1, but showing the device as it appears after the loading of the wire rope has caused one of the swaged end portions of the device to slip relative to the rope, but has not caused the frangible central portion of the device to fail.
Figure 3A:
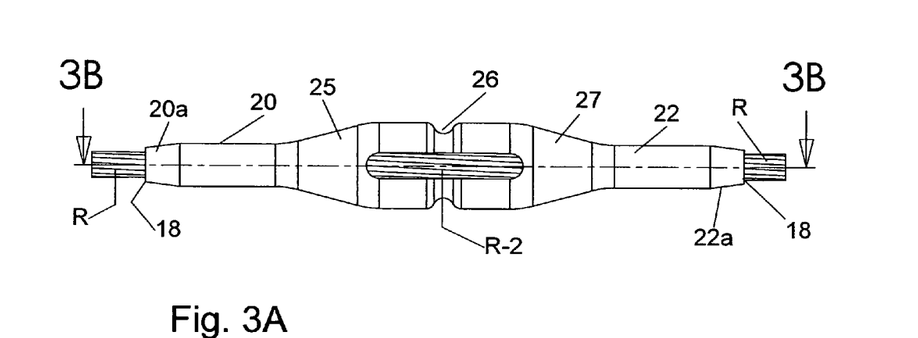
FIG. 3A is a side-elevational view of the wire rope pre-failure indicating device shown in FIG. 3.
Figure 3B:
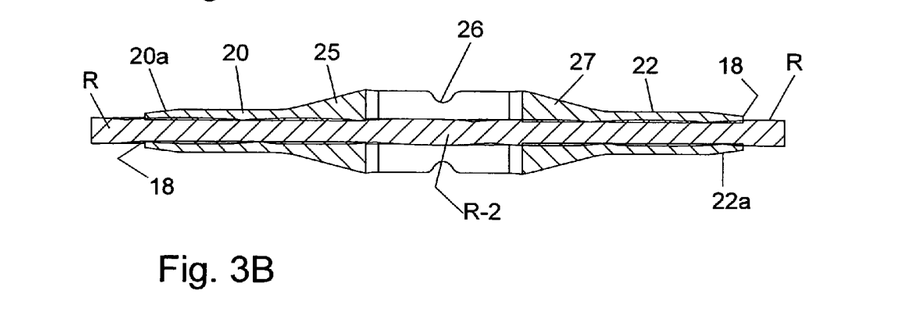
FIG. 3B is a cross-sectional view taken along lines 3B-3B of FIG. 3A.

Turning to FIGS. 3, 3A and 3B of the drawings, it is to be noted that the reduced area section 26 has not broken and is identical to the appearance of the device as shown in FIG. 1 drawings. However, the curvature, or slack in the wire rope shown in FIGS. 1 and 1B is no longer present. This can only mean that one or both of the swaged sections 20 and 20a or 22 and 22a has slipped thus straightening the wire rope portion "R-2" within the tension-free slot 19. This slippage has occurred at a load less than the specified magnitude since the frangible portion, or reduced area section 26 has not failed. With the device in the configuration shown in FIGS. 3, 3A and 3B it is apparent that the device has been disabled due to one of the swaged sections slipping. Since one or both of the swaged sections 20 and 20a or 22 and 22a has slipped, the other swaged section has become extremely suspect and, therefore, the indicator device needs to be replaced.

Figure 4:
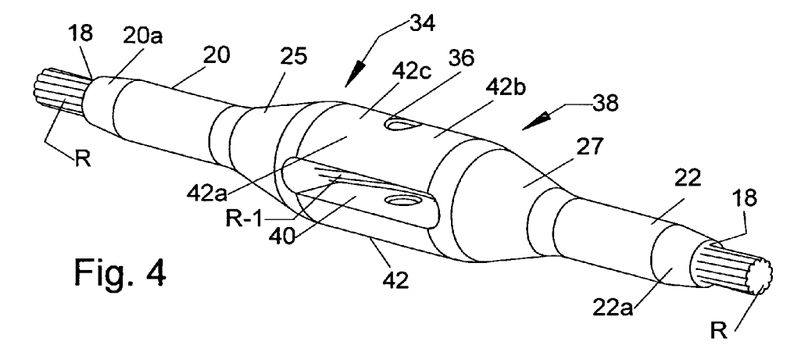
FIG. 4 is a generally isometric view of an alternate embodiment of the invention that has another type of central frangible portion.

Referring to FIG. 4 of the drawings, an alternate form of the pre-failure indicating device of the invention is there shown and generally designated by the numeral 34. This form of the invention is similar in many respects to that shown in FIGS. 1 through 3 of the drawings and like numerals are used in FIG. 4 to identify like components. The primary difference between this latest form of the invention and that earlier described resides in the fact that the frangible portion of the device comprises a transverse bore 36 rather than a reduced diameter portion. The pre-failure indicating device 34 here comprises a generally cylindrical casing 38 that surrounds a portion of the wire rope in the manner illustrated in FIG. 4. As before, casing 38 is provided with a longitudinal wire rope receiving bore 18 for receiving the uninterrupted length of wire rope "R". Additionally, casing 38 is provided with a viewing portal, here shown as a longitudinally extending slot 40, for viewing the length of wire rope. Casing 38 also includes first and second spaced-apart end portions 20 and 22 that are connected to the wire rope and a central body portion 42 that is disposed between said first and second end portions. End portions 20 and 22 are interconnected with the wire rope by swaging these sections as well as the terminal portions 20a and 22a to the wire rope in a conventional manner. As was the case with the earlier described embodiment of the invention, after the sections 20 and 20a have been swaged to the wire rope, and prior to the portions 22 and 22a being swaged to the wire rope, the wire rope is urged inwardly in a manner to form within the central portion 42a of body 42 an arc, or slack portion designated as "R-1". After the swaging operation is complete, this important slack portion "R-1" is readily visible through the viewing portal, or longitudinally extending slot 40 formed in the central portion of the casing.

As was the case with the embodiment of FIGS. 1 and 2, when a load of a second pre-determined magnitude, which is less than the load of a first magnitude, is placed on the wire rope the central body portion 42 in the area of the transverse bore 36 will fail resulting in a separation of portions 42b and 42c of central body 42.

As the central body frangible portion fails, the tensile force being applied to the wire rope will be transferred from the leading swaged section 22a of the device to the outer body section 42b. The tensile force will then be transferred back into the wire rope as it continues through the swaged sections 20 and 20a located at the opposite end of the device. As the tensile force is transferred back into the wire rope, the arcuate portion "R-1" of the wire rope will automatically visibly straighten thereby providing a readily observable warning that the load on the wire rope has exceeded an acceptable magnitude. If the device has failed in the reduced diameter portion, as indicated by the visible straightening of the arcuate section of the rope, then the wire rope system has been overloaded and should be replaced.

Figure 5:
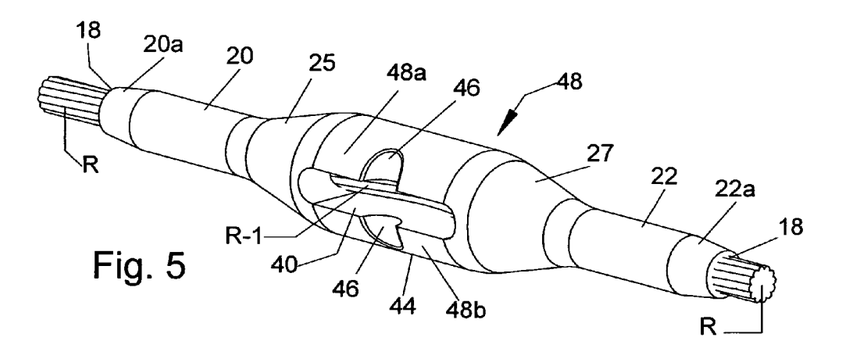
FIG. 5 is a generally isometric view of still another embodiment of the invention showing yet another type of central frangible portion.

Turning now to FIG. 5 of the drawings, still another form of the pre-failure indicating device of the invention is there shown and generally designated by the numeral 44. This embodiment of the invention is substantially identical in construction and operation to that shown in FIG. 4 of the drawings save that the frangible portion of the device is a different configuration. Once again, like numerals are used in FIG. 5 to identify like components. As indicated in FIG. 5, the frangible portion of device 44 comprises generally vertically extending slots 46 that are formed substantially at the center of the body portion 48 of the device casing. As before, the casing is provided with a longitudinal wire rope receiving bore 18 for receiving the uninterrupted length of wire rope "R". When a load of a second pre-determined magnitude, which is less than the load of a first magnitude, is placed on the wire rope the central body portion 48 in the area of the transverse bore will fail resulting in a separation of portions 48a and 48b of central body 48. As the central body frangible portion fails, the tensile force being applied to the wire rope will be transferred from the leading swaged sections 22 and 22a of the device to the outer body section 48b. The tensile force will then be transferred back into the wire rope as it continues through the swaged sections 20 and 20a located at the opposite end of the device. As the tensile force is transferred back into the wire rope, the arcuate portion "R-1" of the wire rope will automatically visibly straighten thereby providing a readily observable warning that the load on the wire rope has exceeded an acceptable magnitude. If the device has failed in the reduced diameter portion, as indicated by the visible straightening of the arcuate section of the rope, then the wire rope system has been overloaded and should be replaced.

Figure 6:
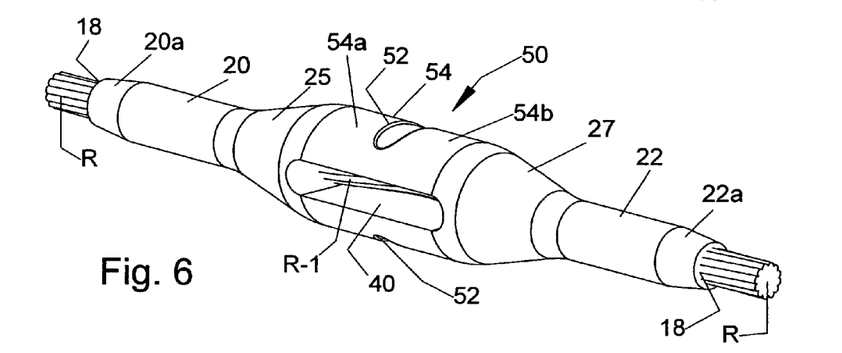
FIG. 6 is a generally isometric view of yet another embodiment of the invention showing still another type of central frangible portion.

Referring to FIG. 6 of the drawings, yet another form of the pre-failure indicating device of the invention is there shown and generally designated by the numeral 50. This embodiment of the invention is also substantially identical in construction and operation to that shown in FIG. 4 of the drawings save that the frangible portion of the device is a different configuration. As before, like numerals are used in FIG. 6 to identify like components. As illustrated in FIG. 6, the frangible portion of the device 50 here comprises transversely spaced-apart slots 52 that are generally oval in cross-section and are located substantially at the center of the body portion 54 of this embodiment. Once again, the casing is provided with a longitudinal wire rope receiving bore 18 for receiving the uninterrupted length of wire rope "R". When a load of a second pre-determined magnitude, which is less than the load of a first magnitude, is placed on the wire rope the central body portion 46 in the area of the transverse bore will fail resulting in a separation of portions 54a and 54b of central body 54. As the central body frangible portion fails, the tensile force being applied to the wire rope will be transferred from the leading swaged sections 22 and 22a of the device to the outer body section 54b. The tensile force will then be transferred back into the wire rope as it continues through the swaged sections 20 and 20a located at the opposite end of the device. As the tensile force is transferred back into the wire rope, the arcuate portion "R-1" of the wire rope will automatically visibly straighten thereby providing a readily observable warning that the load on the wire rope has exceeded an acceptable magnitude. If the device has failed in the reduced diameter portion, as indicated by the visible straightening of the arcuate section of the rope, then the wire rope system has been overloaded and should be replaced.

Figure 7:
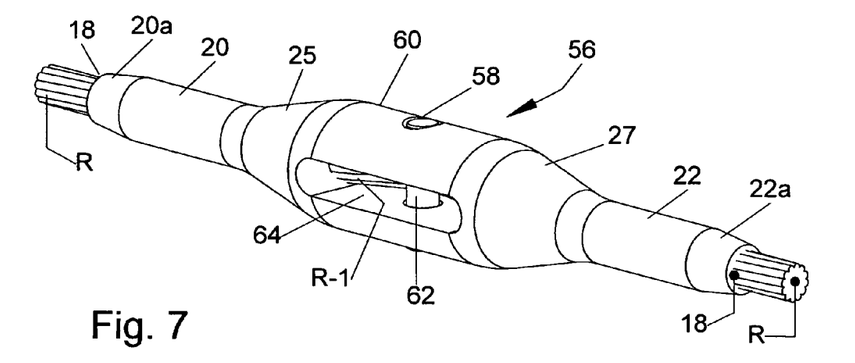
FIG. 7 is a generally isometric view of still another embodiment of the invention showing yet another type of central frangible portion.
Figure 8:
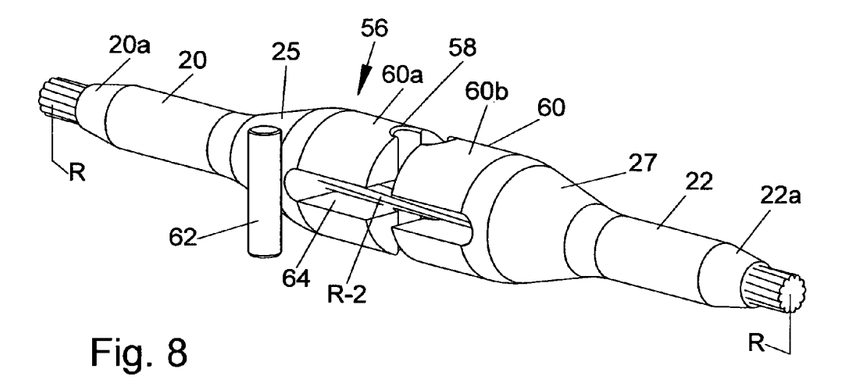
FIG. 8 is a generally isometric view similar to FIG. 7, but showing the device of FIG. 7 as it appears after the loading of the wire rope has exceeded a specified magnitude.
Figure 9:
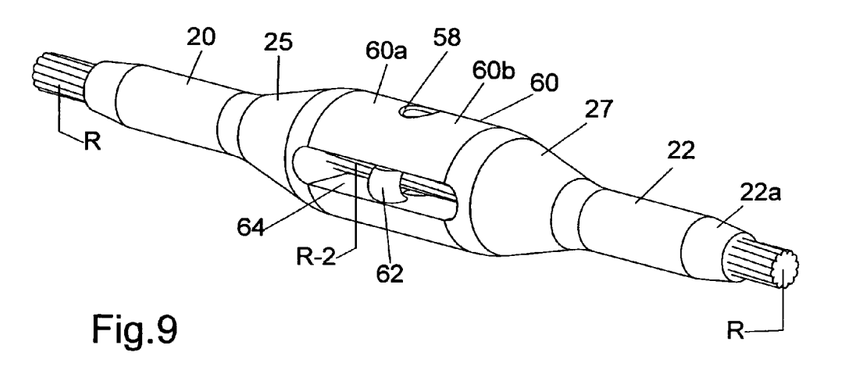
FIG. 9 is a generally isometric view similar to FIG. 7, but showing the device of FIG. 7 as it appears after the device has been disabled due to the wire rope slipping within one of the swaged section at ends of the device.

Referring next to FIGS. 7, 8 and 9 of the drawings, yet another form of the pre-failure indicating device of the invention is there shown and generally designated by the numeral 56. This embodiment of the invention is somewhat similar in construction and operation to that shown in FIG. 4 of the drawings save that, once again, the frangible portion of the device is a different configuration. Because of the similarity between the latest form of the invention and that shown in FIG. 4, like numerals are used in FIGS. 7, 8 and 9 to identify like components. As indicated in FIGS. 7 and 8, the frangible portion of device, like that of FIG. 4 comprises a generally vertically extending bore 58 that is formed substantially at the center of the body portion 60 of the device casing. An indicator pin 62, which is slidably received within bore 58, requires the wire rope "R" to be threaded around the pin in the manner shown in FIG. 7. This assures that a pre-determined amount of slack will be formed in the portion of the wire rope "R-1" that resides within the tension-free slot 64. With this construction, when a load of a second pre-determined magnitude, which is less than the load of a first magnitude, is placed on the wire rope the central body portion 60 in the area of the transverse bore 58 will fail resulting in a separation of portions 60a and 60b of central body 60 (see FIG. 8).

As the frangible portion fails, indicator pin 62 will be ejected from bore 58. This failure of the frangible portion and the straightening of the wire rope portion "R-2" along with the ejection of indicator pin 62 provides a clear visible indication that, for the reasons previously described, the load on the wire rope has exceeded a specified magnitude.

If desired, to provide even a more pronounced visible indication of the overloading of the wire rope, the indicator pin 62 can be constructed in the form of a thin walled, sealed cylinder that contains a colored liquid dye. With such a construction, when the frangible portion of the device fails and the indicator pin is ejected, or when one of the swaged sections 20 and 20a or 22 and 22a slips and the indicator pin 62 is deformed in the manner shown in FIG. 9 of the drawings, the colored dye within the indicator pin will flow from the failed pin thereby providing a further visible indication that the load on the wire rope has exceeded a specified magnitude.

Turning to FIG. 9 of the drawings, it is to be noted that the frangible area of the central body portion 60 has not broken. However, the curvature, or slack in the wire rope shown in FIG. 7 is no longer present if the indicator pin 62 has been deformed. This can only mean that one or both of the swaged sections 20 and 20a or 22 and 22a has slipped thus straightening the wire rope portion "R-1" within the tension-free slot 64. This slippage has occurred at a load less than the specified magnitude since the frangible portion has not failed. With the device in the configuration shown in FIG. 9, it is apparent that the device has been disabled due to one of the swaged sections slipping. Since one or both of the swaged sections 20 and 20a or 22 and 22a has slipped, the other swaged section has become extremely suspect and, therefore, the indicator device needs to be replaced.

Figure 10:
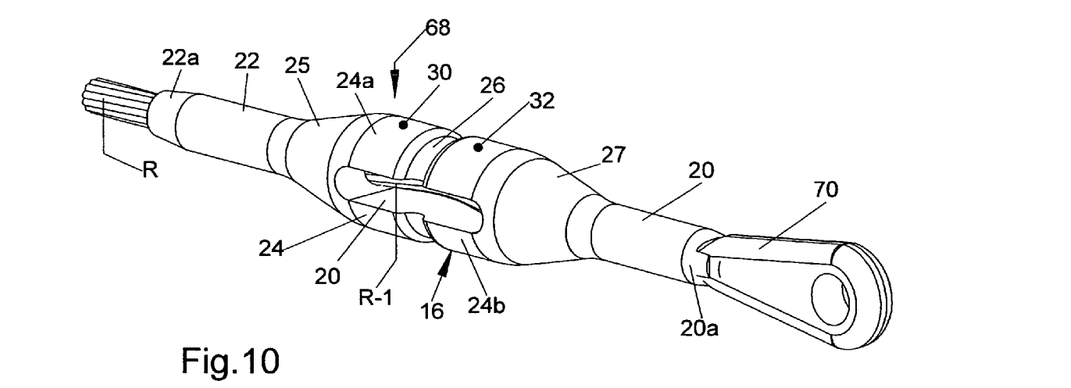
FIG. 10 is a generally isometric view of yet another form of the invention which includes a conventional eye fitting that has been swaged on the end of a wire rope.

Turning next to FIG. 10 of the drawings, still another form of the pre-failure indicating device of the invention is there shown and generally designated by the numeral 68. This embodiment of the invention is substantially identical in operation to the embodiment shown in FIG. 1 of the drawings. However, as indicated in FIG. 10, unlike the embodiment of FIG. 1, a conventional eye-end fitting 70 is connected to the free end of the wire rope "R". Once again, like numerals are used in FIG. 10 to identify like components to those of the embodiment shown in FIG. 1. The frangible portion is provided in the form of a circumferentially extending, reduced diameter portion, or groove 26. When a load of a second pre-determined magnitude, which is less than the load of a first magnitude, is placed on the wire rope the central body frangible portion will fail resulting in a separation of portions 24a and 24b of central body 24. As the central body frangible portion 26 fails, the tensile force being applied to the wire rope will be transferred from the leading swaged sections 22 and 22a of the device to the outer body section 24b. The tensile force will then be transferred back into the wire rope as it continues through the swaged sections 20 and 20a located at the opposite end of the device. As the tensile force is transferred back into the wire rope, the arcuate portion "R-1" of the wire rope will automatically visibly straighten thereby providing a readily observable warning that the load on the wire rope has exceeded an acceptable magnitude.

Figure 11:
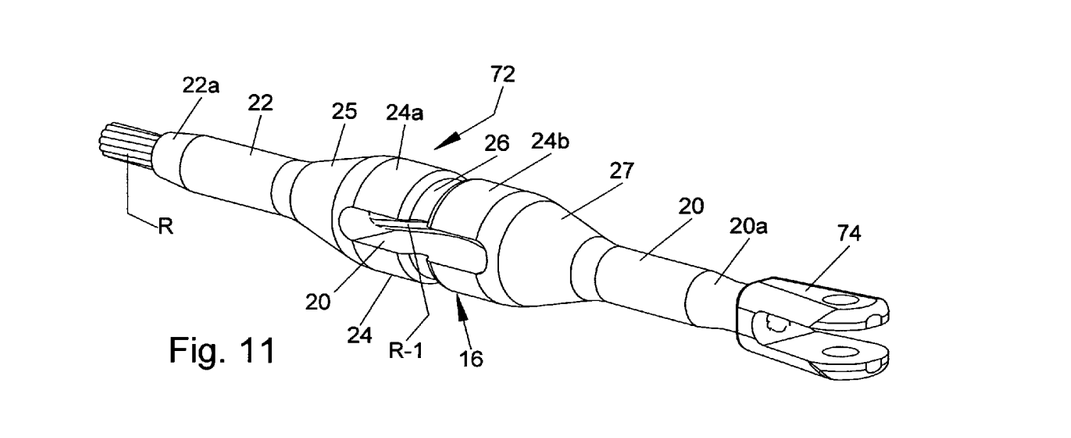
FIG. 11 is a generally isometric view of still another embodiment of the invention which includes a conventional clevis fitting that has been swaged on the end of a wire rope.

Referring to FIG. 11 of the drawings, yet another form of the pre-failure indicating device of the invention is there shown and generally designated by the numeral 72. This embodiment of the invention is also substantially identical in operation to the embodiment shown in FIG. 1 of the drawings. However, as indicated in FIG. 10, unlike the embodiment of FIG. 1, a conventional clevis end fitting 74 is connected to the free end of the wire rope "R". Once again, like numerals are used in FIG. 11 to identify like components to those of the embodiment shown in FIG. 1. The frangible portion is provided in the form of a circumferentially extending, reduced diameter portion, or groove 26. As before, when a load of a second pre-determined magnitude, which is less than the load of a first magnitude, is placed on the wire rope the central body frangible portion will fail resulting in a separation of portions 24a and 24b of central body 24. As the central body frangible portion 26 fails, the tensile force being applied to the wire rope will be transferred from the leading swaged sections 22 and 22a of the device to the outer body section 24b. The tensile force will then be transferred back into the wire rope as it continues through the swaged sections 20 and 20a located at the opposite end of the device. As the tensile force is transferred back into the wire rope, the arcuate portion "R-1" of the wire rope will automatically visibly straighten thereby providing a readily observable warning that the load on the wire rope has exceeded an acceptable magnitude.

Considering next the methods of the invention for pre-determining the failure of an uninterrupted length of wire rope that will fail in tension upon applying a load of a first magnitude to the wire rope. In conducting one form of the method of the invention, a device such as that depicted in FIGS. 1, 1A, 1B, 2, 2A and 2B of the drawings is used. In carrying out this method, once the device casing has been appropriately formed from a metal, such as steel, and the longitudinally extending central bore has been machined to a diameter slightly larger than a diameter of the wire rope with which the device is to be used, the wire rope is threaded through the longitudinally extending bore. This done, the wire rope is pushed inwardly on either side of the device to form in the central body portion of the device a generally arcuate-shaped slack in rope such as that shown in FIGS. 1A and 1B of the drawings. Next, the first and second end portions of the casing are securely connected to the wire rope as by conventional swaging. With the device of the invention thusly connected to the uninterrupted length of the wire rope, a load can be applied to the rope. With the wire rope under load, the slack portion of the wire rope is periodically viewed through the viewing portal until the slack portion straightens. This will indicate either that the central body portion of the device has failed in tension due to the application of the load to the wire rope of a second predetermined magnitude less than the magnitude at which the wire rope will fail (see FIGS. 2, 2A and 2B), or alternatively, that one of the swaged end fittings has failed (see FIGS. 3, 3A and 3B). In either case, this provides a clear indication that the wire rope has been over-stressed and must be replaced.

In carrying out another form of the method of the invention using an indicating device having longitudinally spaced-apart gauge marks machined into the body of the device (see FIG. 1), the distance between the spaced-apart gauge marks is measured using a conventional caliper or like device to obtain a first distance. Next, following the application of the load to the wire rope, the distance between the spaced-apart gauge marks is periodically re-measured to determine a second distance. If the second distance is greater than the first distance, the observer must conclude that the body portion of the device has experienced over-stressing due to an over-stressing of the wire rope and replacement of the device and replacement of the wire rope must be considered.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

We claim:

1. A pre-failure indicating device for use with a length of wire rope that will fail in tension upon applying a load of a first magnitude to the wire rope, said device comprising a casing surrounding a portion of the wire rope, said casing having a longitudinal wire rope receiving bore therethrough for receiving the uninterrupted length of wire rope, said casing having first and second spaced-apart end portions connected to the wire rope and a central body portion disposed between said first and second end portions, said central body portion having a frangible portion that will fail in tension upon applying a load of a second magnitude to the wire rope.

2. The device is defined in claim 1 in which said central body portion is provided with a viewing portal for viewing the wire cable.

3. The device is defined in claim 1 in which said central body portion of said casing is provided with longitudinally spaced-apart gauge marks.

4. The device is defined in claim 1 in which said frangible portion of said central body portion comprises a circumferentially extending groove.

5. The device is defined in claim 1 in which said frangible portion of said central body portion comprises a transverse bore.

6. The device as defined in claim 1 in which said load of said second magnitude comprises approximately 60 percent of said load of said first magnitude.

7. The device as defined in claim 1 in which said load of said second magnitude comprises approximately 75 percent of said load of said first magnitude.

8. The device as defined in claim one and which said central body portion of said casing has a first diameter and in which said first and second end portions have a second diameter less than said first diameter.

9. The device as defined in claim 1 in which said body portion said first and second end portions are generally cylindrical.

10. A pre-failure indicating device for use with a length of wire rope that will fail in tension upon applying a load of a first magnitude to the wire rope, said device comprising a generally cylindrical casing surrounding a portion of the wire rope, said casing having a viewing portal for viewing the length of wire rope and a longitudinal wire rope receiving bore therethrough for receiving the uninterrupted length of wire rope, said casing having first and second spaced-apart end portions connected to the wire rope and a central body portion disposed between said first and second end portions, said central body portion having a frangible portion that will fail in tension upon applying a load of a second magnitude to the wire rope, said load of the second magnitude being less than said load of a first magnitude.

11. The device is defined in claim 10 in which said viewing portal comprises a longitudinal slot formed in said central body portion of said casing.

12. The device is defined in claim 10 in which said central body portion of said casing is provided with longitudinally spaced-apart gauge marks.

13. The device is defined in claim 10 in which said frangible portion of said central body portion comprises a circumferentially extending groove.

14. The device as defined in claim 10 in which said frangible portion of said central body portion comprises a transverse bore.

15. The device as defined in claim 10 in which said load of said second magnitude comprises between approximately 40 percent and approximately 60 percent of said load of said first magnitude.

16. The device as defined in claim 10 in which said load of said second magnitude comprises between approximately 60 percent and approximately 80 percent of said load of said first magnitude.

17. The device is defined in claim 10 in which said frangible portion of said central body portion comprises a transverse bore and in which said device further comprises a generally cylindrically shaped indicator member slidably received within the transverse bore.

18. The device as defined in claim 10 in which said load of said second magnitude comprises between approximately 80 percent and approximately 90 percent of said load of said first magnitude.

19. A method for predetermining the failure of an uninterrupted length of wire rope that will fail in tension upon applying a load of a first magnitude to the wire rope using a device comprising a casing surrounding a portion of the wire rope, the casing having a longitudinal wire rope receiving bore therethrough for receiving the uninterrupted length of wire rope, the casing having first and second spaced-apart end portions connected to the wire rope and a central body portion disposed between the first and second portions, the central body portion having a failure area that will fail in tension upon applying a load of a second magnitude to the wire rope and a viewing portal for viewing the wire cable, said method comprising the steps of:
 (a) threading the wire rope through the longitudinally extending bore of the device;
 (b) securely swaging the first portion of the casing of the device to the wire rope;
 (c) forming an arc in the wire rope internally of the central body portion of the device;
 (d) securely swaging the second portion of the casing of the device to the wire rope;
 (e) applying a load to the wire rope; and
 (f) observing the wire rope through the viewing portal until the arc in the rope straightens.

20. The method as defined in claim 19 in which the casing of the device includes longitudinally spaced-apart gauge marks and in which the method of the invention includes the steps of measuring the distance between the spaced-apart gauge marks to obtain a first distance, then, following in the application of the load to the wire rope, re-measuring the distance between the spaced-apart gauge marks to determine a second distance greater than said first distance.

* * * * *